United States Patent
Ueki

(10) Patent No.: US 11,205,107 B2
(45) Date of Patent: Dec. 21, 2021

(54) RFID TAG

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 51 days.

(21) Appl. No.: 16/901,068

(22) Filed: Jun. 15, 2020

(65) Prior Publication Data
US 2020/0380327 A1 Dec. 3, 2020

Related U.S. Application Data

(63) Continuation of application No. PCT/JP2019/048067, filed on Dec. 9, 2019.

(30) Foreign Application Priority Data

May 27, 2019 (JP) .............................. JP2019-098741

(51) Int. Cl.
*G06K 19/07* (2006.01)
*H01Q 1/22* (2006.01)
(Continued)

(52) U.S. Cl.
CPC ... *G06K 19/0723* (2013.01); *G06K 19/07786* (2013.01); *H01Q 1/2225* (2013.01); *H01Q 9/285* (2013.01)

(58) Field of Classification Search
CPC ......... G06K 19/0723; G06K 19/07771; G06K 19/07786; H01Q 1/2225; H01Q 9/285
See application file for complete search history.

(56) References Cited

U.S. PATENT DOCUMENTS 7,518,567 B2 * 4/2009 Utagawa ................ H01Q 1/243
343/700 MS
8,098,203 B2 1/2012 Ueki
(Continued)

FOREIGN PATENT DOCUMENTS

JP H09167214 A 6/1997
JP 2007221774 A 8/2007
(Continued)

OTHER PUBLICATIONS

International Search Report issued for PCT/JP2019/048067, dated Mar. 3, 2020.
(Continued)

*Primary Examiner* — Sisay Yacob
(74) *Attorney, Agent, or Firm* — Arent Fox LLP

(57) ABSTRACT

An RFID tag is provided that includes an RFIC chip having a first connection terminal and a second connection terminal, a first electrode electrically connected to the first connection terminal of the RFIC chip, a capacitance element connected in series to the first electrode and the RFIC chip, and short-circuit parts connecting the first electrode and a ground at an intermediate position of an electrical length of the first electrode. Moreover, the electrical length of the first electrode is a half of a wavelength of a communication frequency of the RFIC chip, the first connection terminal of the RFIC chip is connected to the first electrode at a position within one third of the electrical length from an end portion of the first electrode, and the second connection terminal of the RFIC chip is connected to the ground.

20 Claims, 9 Drawing Sheets

(51) Int. Cl.
*G06K 19/077* (2006.01)
*H01Q 9/28* (2006.01)

(56) References Cited

U.S. PATENT DOCUMENTS

| | | | | |
|---|---|---|---|---|
| 8,991,713 | B2* | 3/2015 | Dokai | G06K 19/07786 |
| | | | | 235/492 |
| 9,705,206 | B2* | 7/2017 | Yosui | H01Q 7/00 |
| 9,847,585 | B2* | 12/2017 | Yosui | H01Q 1/2216 |
| 10,033,113 | B2* | 7/2018 | Yosui | H01Q 7/00 |
| 2007/0171132 | A1* | 7/2007 | Utagawa | H01Q 9/0421 |
| | | | | 343/700 MS |
| 2009/0303133 | A1 | 12/2009 | Ueki | |
| 2013/0200162 | A1* | 8/2013 | Dokai | G06K 19/07786 |
| | | | | 235/492 |
| 2015/0116168 | A1* | 4/2015 | Yosui | H01Q 1/2208 |
| | | | | 343/722 |
| 2015/0180136 | A1* | 6/2015 | Yosui | H01Q 5/335 |
| | | | | 343/702 |
| 2018/0069325 | A1* | 3/2018 | Yosui | H01Q 5/335 |

FOREIGN PATENT DOCUMENTS

| | | | |
|---|---|---|---|
| JP | 2008258670 | A | 10/2008 |
| JP | 2016027715 | A | 2/2016 |
| WO | 2008072411 | A1 | 6/2008 |
| WO | 2012096365 | A1 | 7/2012 |

OTHER PUBLICATIONS

Written Opinion of the International Searching Authority issued for PCT/JP2019/048067, dated Mar. 3, 2020.

* cited by examiner

RFID TAG

CROSS REFERENCE TO RELATED APPLICATIONS

The present application is a continuation of PCT/JP2019/048067 filed Dec. 9, 2019, which claims priority to Japanese Patent Application No. 2019-098741, filed May 27, 2019, the entire contents of each of which are incorporated herein by reference.

TECHNICAL FIELD

The present invention relates to an RFID (Radio frequency Identification) tag that is a wireless communication device used for performing article information management, and the like, in a non-contact manner using short-range wireless communication.

BACKGROUND

Conventionally, in a system performing article information management, communication is performed between an RFID tag attached to an article and a reader device reading tag information of the RFID tag by using an electromagnetic field in a non-contact method so as to manage information related to the article.

In determining a resonance frequency of an antenna in an RFID tag, for example, if only one resonance mode exits as in a microstrip antenna, the RFID tag is limited in use due to a narrow resonance frequency band. Additionally, for example, if the RFID tag is attached to a metal surface, the resonance frequency band becomes narrower.

Therefore, a method of combining two resonances is utilized for widening the resonance frequency band. This method is implemented by combining different modes of resonance. For example, if a microstrip antenna is in a dipole mode, a monopole mode is combined therewith. However, the monopole mode leads to occurrence of a null point causing a change in direction of a current on the antenna, which weakens directivity in a communication direction. For example, Patent Document 1 (identified below) describes a two-resonance antenna attached to a metal surface.

FIG. 13 shows a VSWR (Voltage Standing Wave Ratio) characteristic of a two-resonance antenna in which an intermediate point of a planar antenna having a half wavelength $\lambda/2$ of a wavelength $\lambda$ of a communication frequency is short-circuited in Patent Document 1. FIG. 13 shows that the antenna in Patent Document 1 resonates at two positions near 3400 MHz and 4600 MHz. FIG. 14 shows directivity of an electric field plane at respective resonance points on the low frequency side and the high frequency side in Patent Document 1. The directivity shown is normalized on the basis of respective peak maximum values on the low frequency side and the high frequency side.

A characteristic line a on the low frequency side has a peak of directivity at an angle θ near the angle of 50°, and a characteristic line b on the high frequency side has a peak of directivity at an angle θ near the angle of 0°.

Patent Document 1: WO 2008/072411.

As shown in FIG. 14, a conventional two-resonance antenna has a peak angle of directivity on the high frequency side shifted from a peak angle of directivity on the low frequency side. Therefore, when an RFID tag is disposed on an article in accordance with the directivity on the high frequency side, the directivity on the low frequency side is reduced.

SUMMARY OF THE INVENTION

Therefore, it is an object of the exemplary embodiments of present invention to address the problem described above. As such, an RFID tag is provided having characteristics of a two-resonance antenna and improved directivity.

According to an exemplary aspect of the present invention an RFID tag is provided that includes an RFIC chip having a first connection terminal and a second connection terminal; a first electrode electrically connected to the first connection terminal of the RFIC chip; a capacitance element connected in series between the first electrode and the RFIC chip; and short-circuit parts connecting the first electrode and a ground at an intermediate position of an electrical length of the first electrode. Moreover, the electrical length of the first electrode is a half of a wavelength of a carrier frequency of the RFIC chip, the first connection terminal of the RFIC chip is connected to the first electrode at a position within one third of the electrical length from an end portion of the first electrode, and the second connection terminal of the RFIC chip is connected to the ground.

According to the RFID tag of the present invention, an RFID tag is provided having characteristics of a two-resonance antenna and improved directivity.

DETAILED DESCRIPTION

Figure 1A:
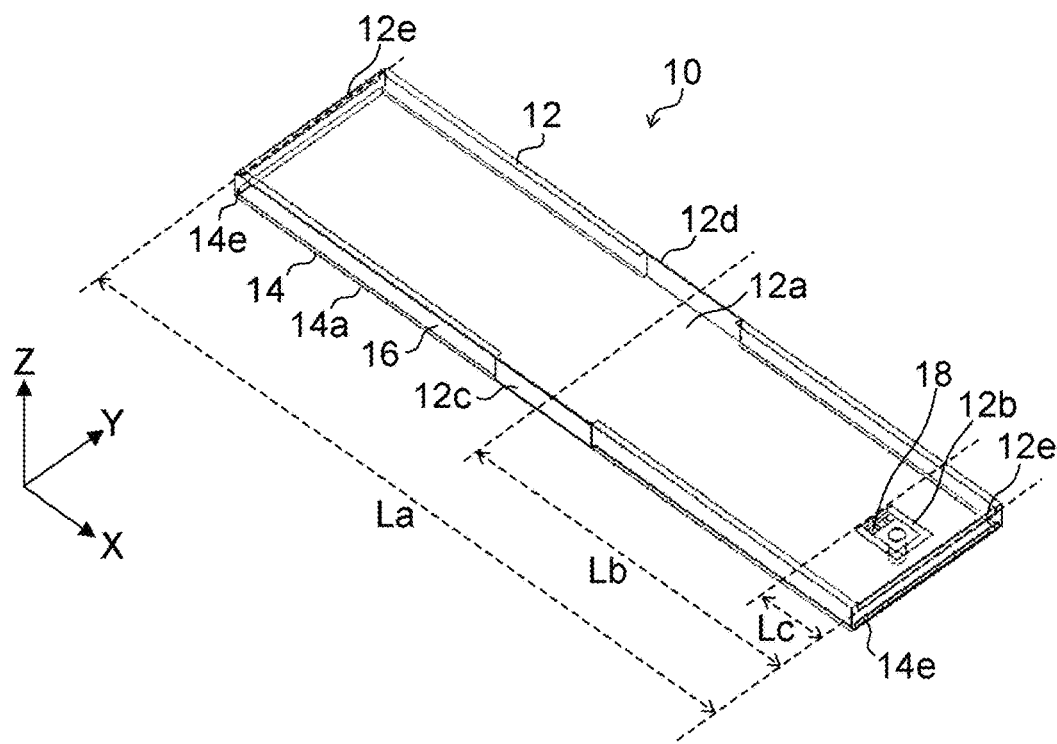
FIG. 1A is a schematic perspective view showing an RFID tag of a first exemplary embodiment.

An RFID tag according to an exemplary aspect includes an RFIC chip having a first connection terminal and a second connection terminal, a first electrode electrically connected to the first connection terminal of the RFIC chip, a capacitance element connected in series to the first electrode and the RFIC chip, and short-circuit parts connecting the first electrode and a ground at an intermediate position of an electrical length of the first electrode. Moreover, the electrical length of the first electrode is a half of a wavelength of a carrier frequency of the RFIC chip; the first connection terminal of the RFIC chip is connected to the first electrode at a position within one third of the electrical length from an end portion of the first electrode; and the second connection terminal of the RFIC chip is connected to the ground.

According to this exemplary aspect, since the capacitance element is connected in series between the first electrode and the RFIC chip, the current distribution of the first electrode can be changed. As a result, a null point located at the intermediate position of the first electrode can be shifted toward the end portion, and a peak angle of directivity on the low frequency side can be shifted toward 0°. Therefore, a gap between the peak angle of directivity on the high frequency side and the peak angle of directivity on the low frequency side can be reduced, and the RFID tag is provided having characteristics of a two-resonance antenna and improved directivity.

In an exemplary aspect, the first connection terminal of the RFIC chip can be connected to the first electrode via the capacitance element at a position within one third of the electrical length from the end portion of the first electrode.

In an exemplary aspect, an inductance element connected in parallel to each of the first connection terminal and the second connection terminal of the RFIC chip can be included. As a result, an inter-terminal capacity between the first connection terminal and the second connection terminal of the RFIC chip can be canceled.

In an exemplary aspect, the first connection terminal of the RFIC chip can be connected to the first electrode at a position within one sixth of the electrical length from the end portion of the first electrode, and the second connection terminal of the RFIC chip can be connected to the ground at a position within one sixth of the electrical length from the end portion of the first electrode. By disposing the RFIC chip closer to the end portion of the first electrode in this way, communication characteristics can further be improved.

In an exemplary aspect, a second electrode facing the first electrode can be included as the ground. When the RFID tag is attached to a metal article, it is only necessary to affix the second electrode to a metal surface, so that the attachment to the metal surface is facilitated.

In an exemplary aspect, tan insulating substrate can be included between the first electrode and the second electrode. The electrical length can be shortened by a dielectric of the insulating substrate, and the RFID tag can be reduced in size.

In an exemplary aspect, the first electrode and the second electrode can have a rectangular shape, and the electrical length of each of the first electrode and the second electrode is the electrical length in the longitudinal direction of the first electrode and the second electrode.

In an exemplary aspect, respective longitudinal open ends of the first electrode and the second electrode can be bent to come closer to each other. As a result, a capacity can be generated between the respective bent open ends of the first electrode and the second electrode.

Moreover, the short-circuit parts can each connect longitudinal intermediate positions of the first electrode and the second electrode.

In an exemplary aspect, a connection conductor can be provided that penetrates the insulating substrate to electrically connect the first electrode and the second electrode. Moreover, the second connection terminal of the RFIC chip may electrically be connected to the connection conductor, and the connection conductor may be located at a position within one third of the electrical length from the end portion of the first electrode.

Furthermore, the connection conductor can be located at a position within one sixth of the electrical length from the end portion of the first electrode.

An RFID tag according to the exemplary embodiments of the present invention will now be described with reference to the drawings. In the drawings, members having substantially the same function and configuration are denoted by the same reference numeral and may not be described in the description. To facilitate understanding, the drawings are schematic representations mainly showing respective constituent elements.

All the exemplary embodiments described below show specific examples of the present invention, and the present invention is not limited to these configurations. It is noted that numerical values, shapes, configurations, steps, order of steps, etc. specifically described in the following embodiments are merely examples and do not limit the present invention.

As used herein for purposes of this disclosure, an "electrical length" is a length with a wavelength shortening effect of a dielectric taken into consideration.

First Embodiment

Figure 1B:
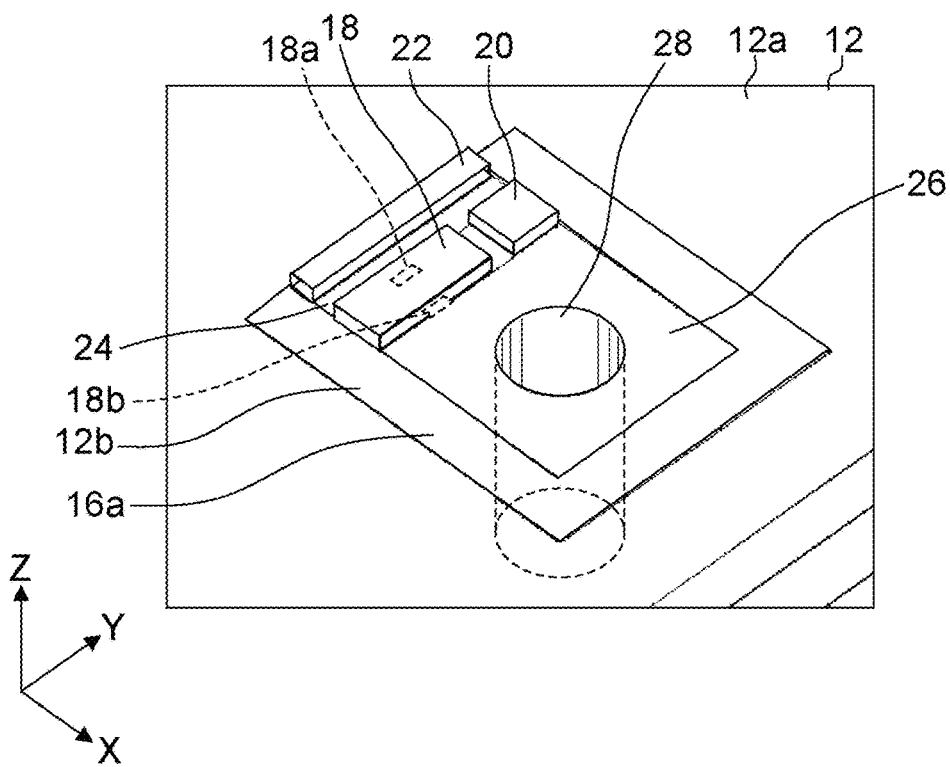
FIG. 1B is an enlarged view of a portion of FIG. 1A.

An RFID (Radio-Frequency IDentification) tag according to a first exemplary embodiment of the present invention will hereinafter be described. FIG. 1A is a schematic perspective view of an RFID tag 10 of the first embodiment. FIG. 1B is an enlarged view of a portion of FIG. 1A. It is noted that in the figures, an X-Y-Z coordinate system is for facilitating understanding of the invention and does not limit the invention. An X-axis direction indicates a longitudinal direction of the RFID tag 10, a Y-axis direction indicates a width direction of the RFID tag 10, and a Z-axis direction indicates a thickness direction of the RFID tag 10. The X, Y, and Z directions are orthogonal to each other.

The RFID tag 10 includes a first electrode 12 serving as a flat plate antenna, a second electrode 14 arranged to oppose the first electrode 12 as a ground, an insulating substrate 16 arranged between the first electrode 12 and the second electrode 14 as a dielectric, an RFIC(Radio-Frequency Integrated Circuit) chip 18, an inductance element 20 connected to the RFIC chip 18, and a capacitance element 22 connected to the RFIC chip 18 and the first electrode 12. In an exemplary aspect, the first electrode 12 and the second electrode 14 are metal plates of copper or aluminum, for example.

The first electrode 12 has a rectangular main body part 12a, an opening part 12b formed on one end portion side (i.e., an end side or short side) of the main body part 12a, and a first short-circuit part 12c and a second short-circuit part 12d respectively bent toward the second electrode 14 from two long sides of the main body part 12a in a longitudinal center portion of the main body part 12a. The first electrode 12 has a bent part 12e in which a longitudinal open end of the main body part 12a is bent toward the second electrode 14.

Since the first electrode 12 has a rectangular shape, the electrical length of the first electrode 12 is a longitudinal length La of the first electrode 12 including the main body part 12a and the bent part 12e. Therefore, the longitudinal length La of the first electrode 12 is designed to include a half of a wavelength λ of a communication frequency of the RFIC chip 18. The first electrode 12 is a field-emission antenna.

Lower ends of the first short-circuit part 12c and the second short-circuit part 12d are respectively connected to the second electrode. Therefore, the first short-circuit part 12c and the second short-circuit part 12d respectively connect longitudinal intermediate positions of the first electrode 12 and the second electrode 14. The first short-circuit part 12c and the second short-circuit part 12d may be bent from the second electrode 14 side toward the first electrode 12 or may be members separated from the first electrode 12 and the second electrode 14 in another exemplary aspect. The longitudinal lengths of the first and second short-circuit parts 12c, 12d have any length for adjusting a resonance frequency.

The second electrode 14 includes a rectangular main body part 14a and a bent part 14e in which a longitudinal open end is bent toward the first electrode 12. The second electrode 14 may have the same shape as the first electrode 12 as described above or may have a shape different from the first electrode 12. For example, the second electrode 14 may have the main body part 14a with a wider or narrower area than the first electrode 12. The first electrode 12 and the second electrode 14 may have a square shape or a disk shape other than the rectangular shape. When the first electrode 12 has a disk shape, the electrical length of the first electrode 12 is the length of the diameter. Therefore, the diameter of the disc-shaped first electrode 12 has λ/2, which is a half wavelength of the communication frequency. In this case, center points of the first short-circuit part 12c and the second short-circuit part 12d are on the circumference of the disc-shaped first electrode 12, and the first short-circuit part 12c and the second short-circuit part 12d have a relationship of mirror images with respect to a central axis of a circle. The respective distances from the first short-circuit part 12c and the second short-circuit part 12d to the RFIC chip 18 are equal to each other and are equal to or less than π×1/4 of the wavelength λ. When the first electrode 12 has a square shape, the electrical length is the length of one side.

The first electrode 12 has the rectangular opening part 12b on one longitudinal side. As shown in FIG. 1B, the opening part 12b of the first electrode 12 and a region 16a of a portion of the insulating substrate 16 overlap in a top view. Therefore, the region 16a of a portion of the insulating substrate 16 is exposed.

A wiring part 24 and an electrode surface 26 are formed on the region 16a of the insulating substrate 16 surrounded by the opening part 12b. The wiring part 24 is a conductor pattern connecting the capacitance element 22 and the RFIC chip 18. The electrode surface 26 is provided with a connection conductor 28 penetrating the insulating substrate 16 and electrically connected to the second electrode 14. The connection conductor 28 is a through-hole or a via-hole, for example. Moreover, the inside of the through-hole or the via-hole may be plated with a metal conductor or may be filled with a metal conductor.

The insulating substrate 16 is an insulating substrate made of resin or paper, for example, a PET (Polyethylene terephthalate) substrate. Other than PET, a PEN (Polyethylene naphthalate) substrate or a substrate made of polyimide may be used in another exemplary aspect. The insulating substrate 16 has a rectangular shape or may have a square shape or a disk shape in accordance with the shape of the first electrode 12 and the second electrode 14.

The RFIC chip 18 is made up of a multilayer substrate composed of three layers, for example. Specifically, the RFIC chip 18 is formed by laminating multiple flexible insulating sheets made of a resin material such as polyimide or liquid crystal polymer. The RFIC chip 18 has a structure in which various elements are built in a semiconductor substrate formed by using as material a semiconductor such as silicon. The RFIC chip 18 has a first connection terminal 18a and a second connection terminal 18b. In the case of the first embodiment, for example, the first and second connection terminals 18a, 18b are made up of conductor patterns fabricated from a conductive material such as copper.

The inductance element 20 is a chip inductor, for example. The inductance element 20 has one end connected to the wiring part 24 and the other end connected to the electrode surface 26. Therefore, the inductance element 20 is connected in parallel to each of the first connection terminal 18a and the second connection terminal 18b of the RFIC chip 18.

According to the exemplary embodiment, the capacitance element 22 is a capacitor chip or a capacitance pattern formed by wiring, for example. The capacitance element 22 has one end connected to the main body part 12a of the first electrode 12 and the other end connected to the wiring part 24. Therefore, the capacitance element 22 is connected in series to the first electrode 12 and the RFIC chip 18. The capacitance element 22 has a capacitance of 0.3 pF, for example.

The first connection terminal 18a of the RFIC chip 18 is connected to the first electrode 12 at a position within one third of the electrical length from an end portion of the first electrode 12. The second connection terminal 18b of the RFIC chip 18 is connected to the second electrode 14 at a position within one third of the electrical length from the end portion of the first electrode 12. The first connection terminal 18a of the RFIC chip 18 may be connected to the first electrode 12 at a position within one sixth of the electrical length from the end portion of the first electrode 12, and the second connection terminal of the RFIC chip 18 may be connected to the second electrode 14 at a position within one sixth of the electrical length from the end portion of the first electrode 12. By disposing the RFIC chip 18 closer to the end portion of the first electrode 12 in this way, an influence on high-frequency resonance can further be reduced.

The capacitance element 22 can also be connected to the first electrode 12 at a position within one third of the electrical length from the end portion of the first electrode 12 or can even be connected to the first electrode 12 at a position within one sixth of the electrical length from the end portion of the first electrode 12.

As shown in the exemplary embodiment, the RFIC chip 18, the inductance element 20, and the capacitance element 22 are arranged in a central portion in the width direction (Y direction) of the first electrode 12.

Figure 2:
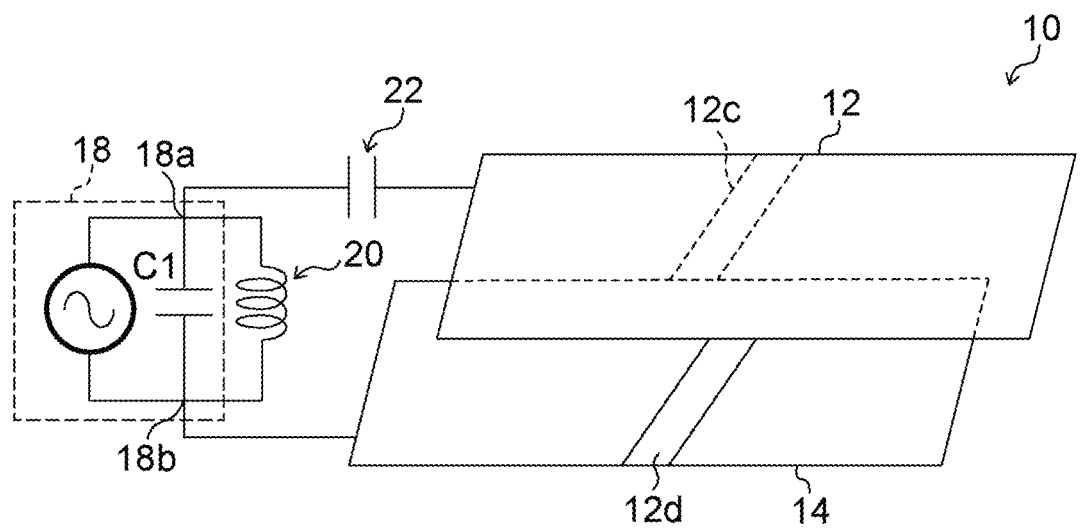
FIG. 2 is an equivalent circuit diagram of the RFID tag of the first exemplary embodiment.

An electrical configuration of the RFID tag 10 will be described with reference to FIG. 2. FIG. 2 is an equivalent circuit diagram of the RFID tag 10. In FIG. 2, for simplicity of illustration, the first electrode 12 and the second electrode 14 are shown in a flat plate shape without bending of the end portions.

The RFIC chip 18 has an internal capacity (i.e., a capacitance) Cl that is a self-capacity of the RFIC chip 18. Additionally, the RFIC chip 18 functions as a power feeding part of an antenna element made up of the first electrode 12. The capacitance element 22 and the inductance element 20 form a matching circuit for matching impedance between the RFIC chip 18 and the antenna element made up of the first electrode 12.

When an impedance Z of the RFIC chip 18 is larger, the RFIC chip 18 serving as the power feeding part can be disposed closer to the end portion of the first electrode 12. The impedance Z of the RFIC chip 18 is about 1.2 kΩ, for example.

Figure 3:
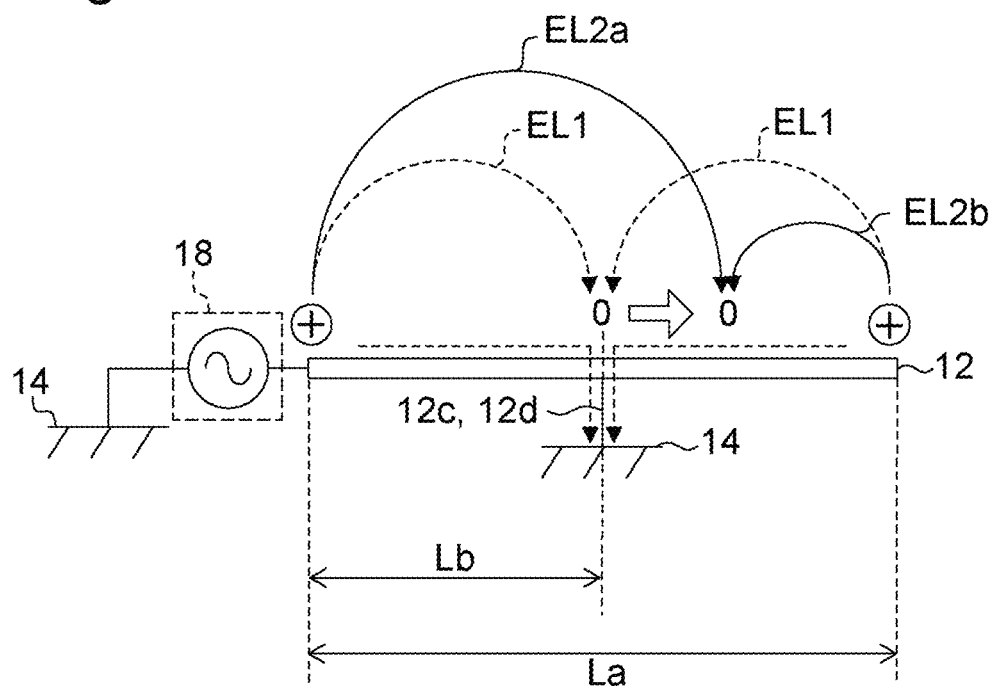
FIG. 3 is an explanatory diagram showing that a null point of an RFID tag moves.

As shown in FIG. 3, the longitudinal length La of the first electrode 12 has λ/2, which is a half wavelength of the communication frequency. The first and second short-circuit parts 12c, 12d connecting the first electrode 12 serving as the antenna element and the second electrode 14 serving as a ground are located at an intermediate position that is a longitudinal central portion of the first electrode 12. If the capacitance element 22 connected in series to the RFIC chip 18 and the first electrode 12 is not included, currents flowing from the respective longitudinal end portions of the first electrode 12 toward the center are reversed in current directions and collide at this intermediate position. A null point is the position where the current direction changes in this way. The occurrence of the null point reduces the directivity of radio waves transmitted and received by the first electrode 12 serving as an antenna element.

If the capacitance element 22 connected in series to the RFIC chip 18 and the first electrode 12 is not included, the electric potential is high at the respective longitudinal end portions of the first electrode 12, and the electric potential is zero at the intermediate position. Therefore, an electric field is generated from each of the longitudinal end portions of the first electrode 12 toward the intermediate position, and an electric line of force as indicated by an arrow EL1 is generated. Therefore, the directivity of a monopole antenna mode is provided.

If the capacitance element 22 connected in series to the RFIC chip 18 and the first electrode 12 is included, the position of the null point shifts from the longitudinal intermediate position of the first electrode 12 toward the longitudinal end portion. Due to this shift of the null point, an electric line of force EL2a extending from the end portion on the side disposed with the RFIC chip 18 extends beyond the intermediate position toward the end portion on the opposite side of the first electrode 12. This makes the directivity closer to that of a microstrip antenna (e.g., a patch antenna) in which an electric line of force extends from one side of an electrode serving as an antenna element to the other opposite side. As described above, the null point can be shifted to shift the position where the directivity of radio waves is reduced, and a reduction in the directivity can be suppressed in the direction perpendicular to the first electrode 12 (θ=0°) in which the directivity is required.

Figure 4:
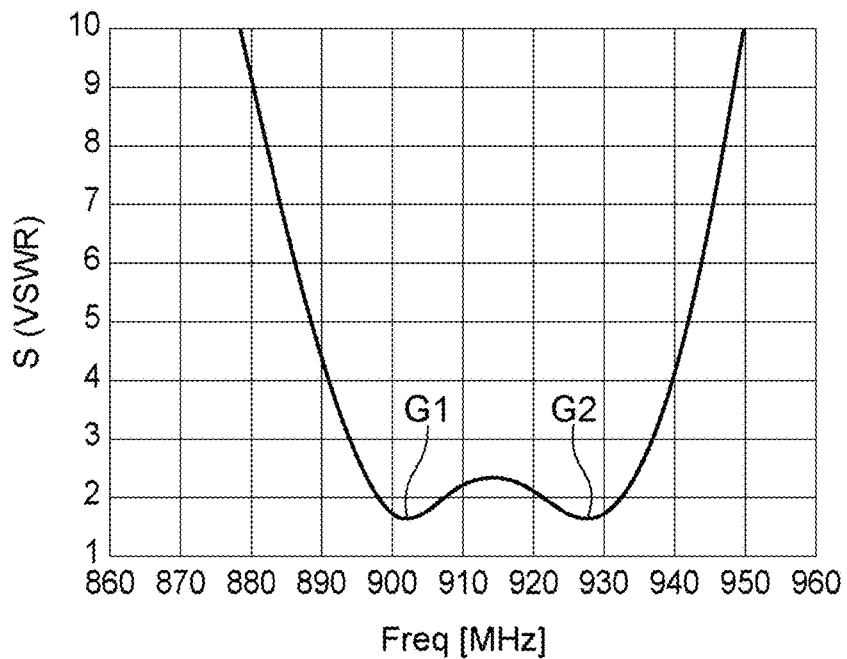
FIG. 4 is a graph showing a VSWR characteristic of the RFID tag of the first exemplary embodiment.
Figure 5:
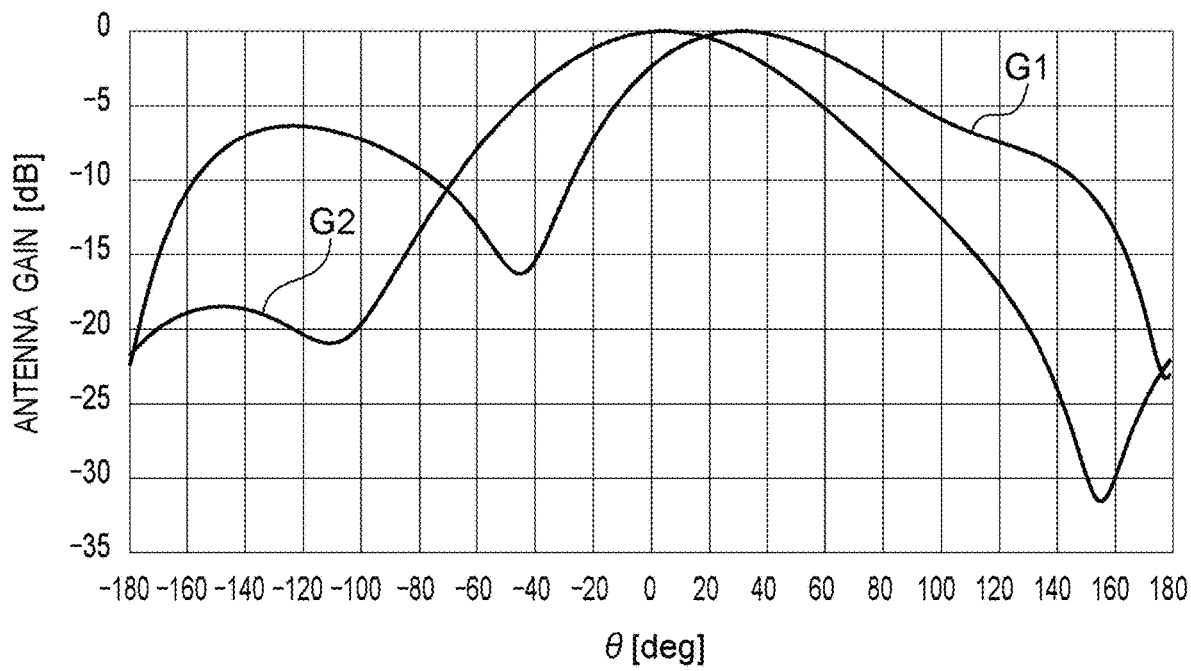
FIG. 5 is a graph showing directivity of the RFID tag of the first exemplary embodiment.
Figure 6:
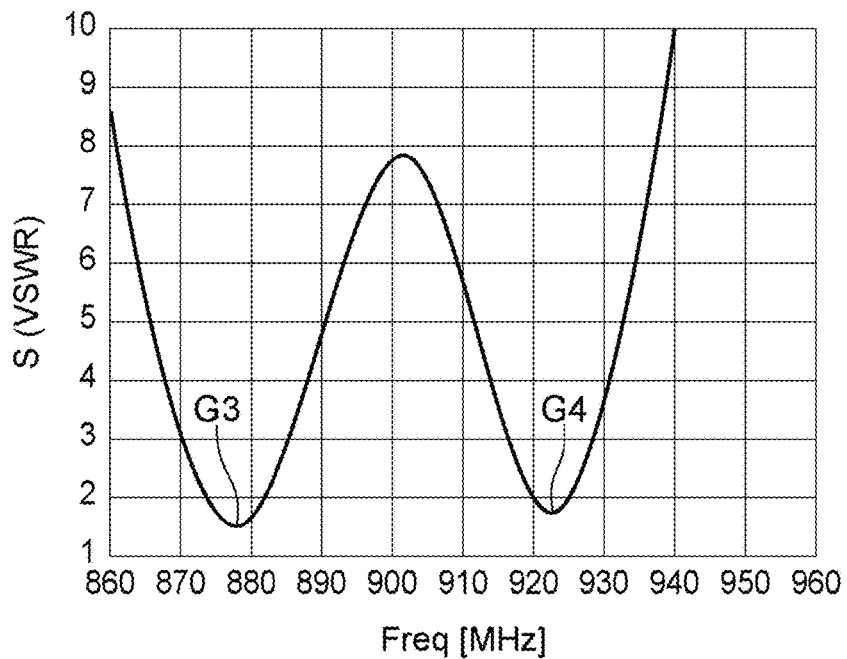
FIG. 6 is a graph showing a VSWR characteristic of an RFID tag of a comparative example.
Figure 7:
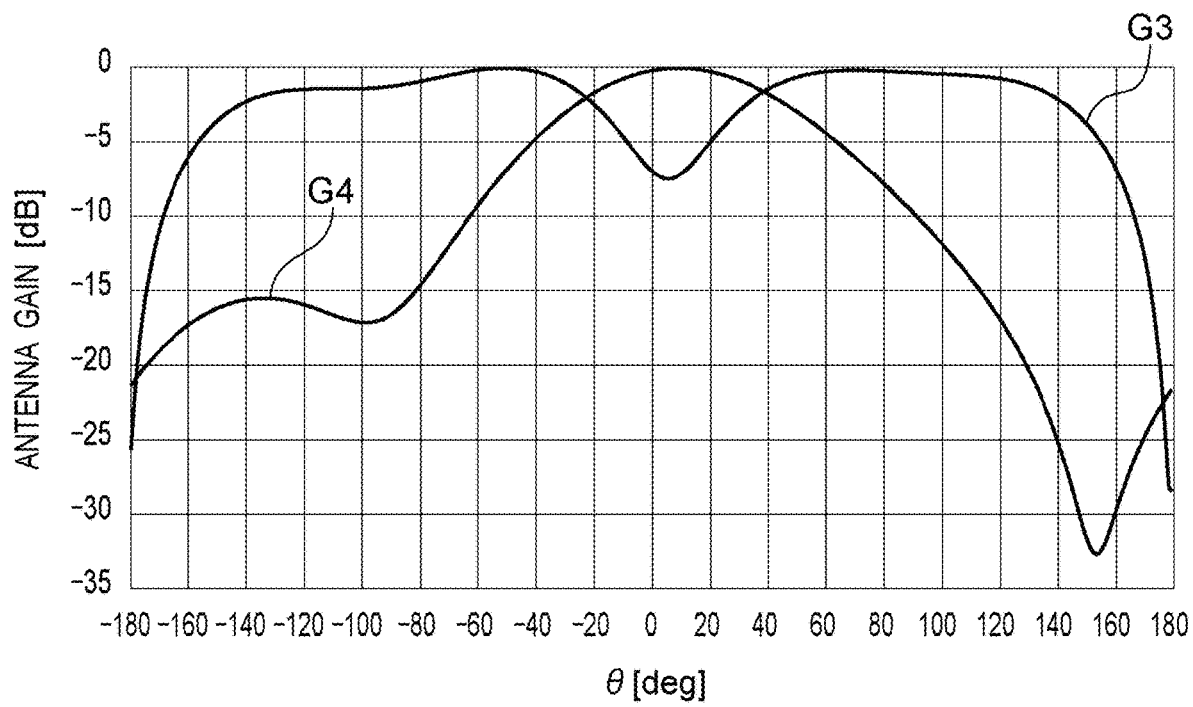
FIG. 7 is a graph showing directivity of the RFID tag of the comparative example.
Figure 8A:
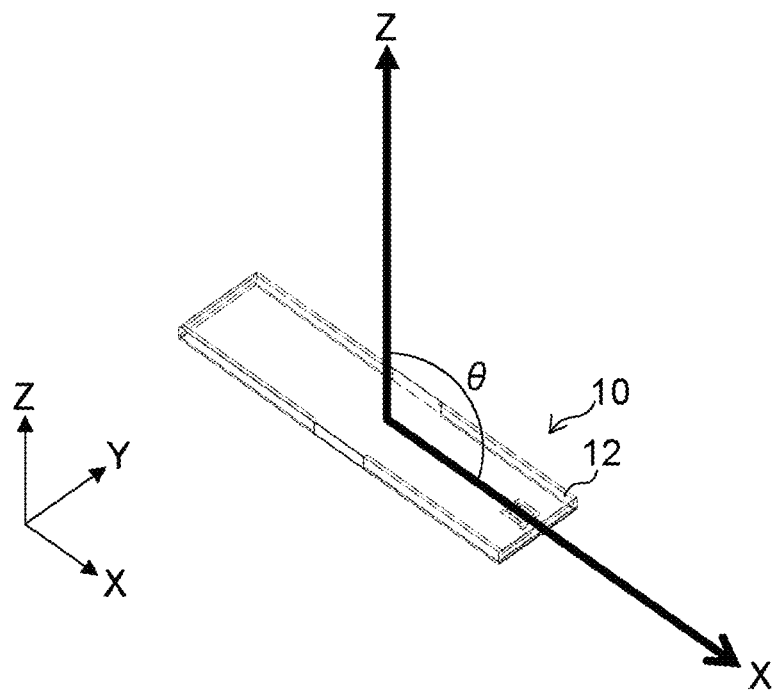
FIG. 8A is an explanatory diagram for explaining an angle of directivity.
Figure 8B:
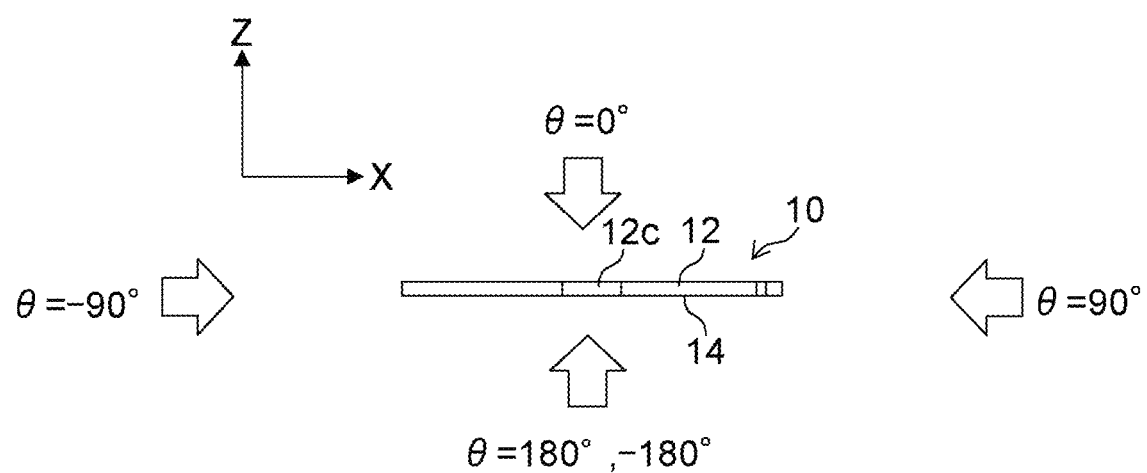
FIG. 8B is an explanatory diagram for explaining an angle of directivity.

The communication characteristics of the first embodiment will be described in more detail. FIG. 4 is a graph showing a VSWR characteristic of the RFID tag of the first embodiment. FIG. 5 is a graph showing the directivity of the RFID tag of the first embodiment. FIG. 6 is a graph showing a VSWR characteristic of an RFID tag without the capacitance element 22 connected in series as a comparative example. FIG. 7 is a graph showing the directivity of the RFID tag without the capacitance element 22 connected in series as a comparative example. FIGS. 8A and 8B are explanatory diagrams for explaining an angle of directivity.

In FIGS. 5 and 7, θ indicates an angle between the Z axis and the X axis on the X-Z plane as shown in FIGS. 8A and 8B. At θ=0°, the direction is perpendicular to the first electrode 12 on the side opposite to the ground, which indicates the directivity in the Z-axis direction. At θ=90°, the direction is parallel to the longitudinal direction of the first electrode 12 on the power feeding part side, which indicates the directivity in the X-axis direction of FIG. 8A. At θ=−90°, the direction is parallel to the longitudinal direction of the first electrode 12 of the side opposite to the power feeding part. At θ=180° and −180°, the direction is perpendicular to the first electrode 12 on the second electrode 14 side (i.e., the ground side).

As shown in FIG. 4, the RFID tag 10 of the first embodiment has the lowest reflected voltage at 903 MHz and 928 MHz. FIG. 5 shows a normalized antenna gain for the angle θ. As shown in FIG. 5, in the RFID tag 10 of the first embodiment, a characteristic line on the high frequency side G2 of 928 MHz has the gain peak near θ=0°. On the low frequency side of 903 MHz, the gain peak is near θ=20° to 40°.

The position of the null point located near 6° in the comparative example as shown in FIG. 7 is shifted to near −44° as shown in FIG. 5. The directivity peaks located near −40° to −60° and 60° to 80° in the comparative example as shown in FIG. 7 are shifted to near 20° to 40° as shown in FIG. 5. Therefore, a gap between the directivity peaks on the low frequency side G1 and the high frequency side G2 in the RFID tag 10 of the first embodiment is reduced as compared to a gap between the directivity peaks on a low frequency side G3 and a high frequency side G4 of the comparative example. Additionally, the gain can be increased near 0° at which the directivity is most required in the RFID tag 10 of the first embodiment.

Figure 9:
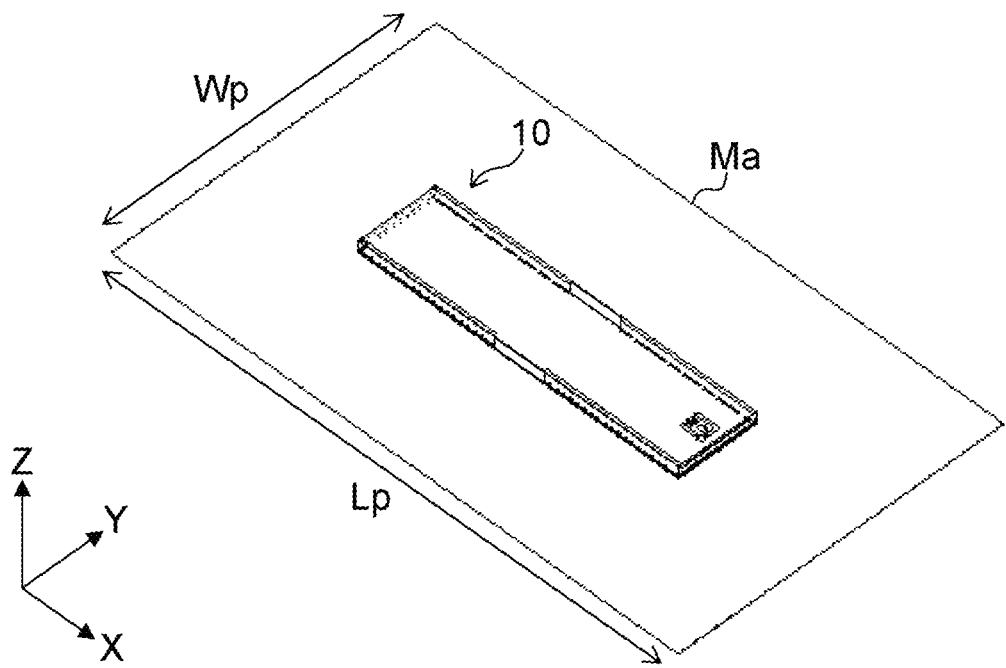
FIG. 9 is an explanatory diagram showing a simulation model.

FIG. 9 is an explanatory diagram showing a model for simulating the current characteristics of the RFID tag 10 of the first embodiment. The RFID tag 10 is placed on a metal plate Ma with a lower surface of the second electrode 14 in contact with a metal plate Ma. A length Lp in the longitudinal direction of the metal plate Ma is 183 mm, and a length Wp in the width direction is 105 mm. The first electrode 12 and the second electrode 14 made of copper have a thickness of 4 μm. In this example, the insulating substrate 16 is made of resin and has a length in the longitudinal direction of 103 mm, a length in the width direction of 25 mm, and a thickness of 4 mm. A dielectric constant εr of the insulating substrate 16 is 3.1. These sizes are examples of a model for simulation, and the sizes of the RFID tag 10 to be used are not limited to these values.

Figure 10A:
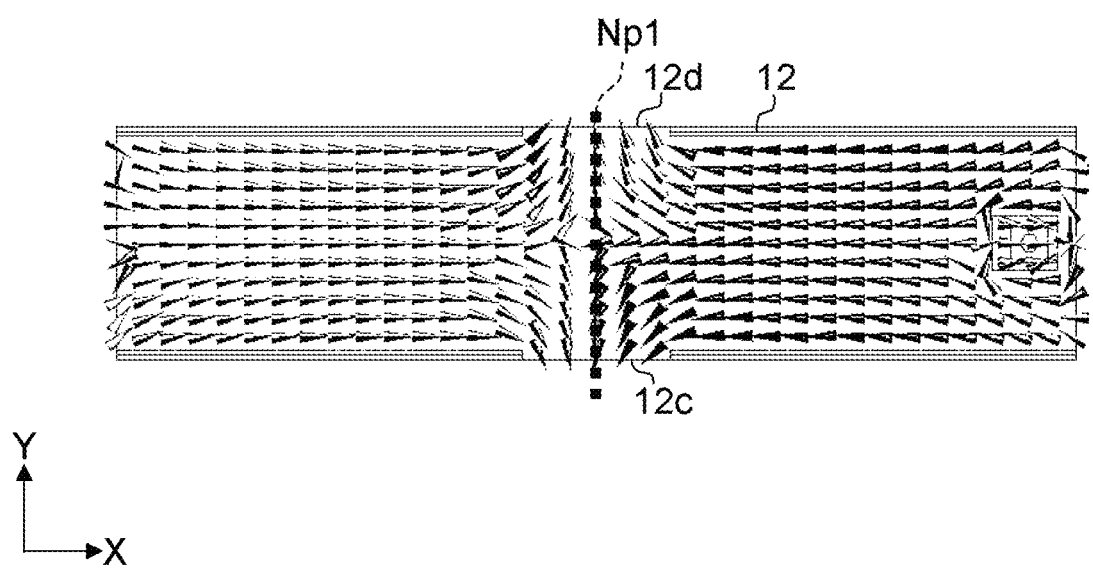
FIG. 10A is a plan view showing a direction of a current at the time of resonance on the low frequency side in a comparative example.
Figure 10B:
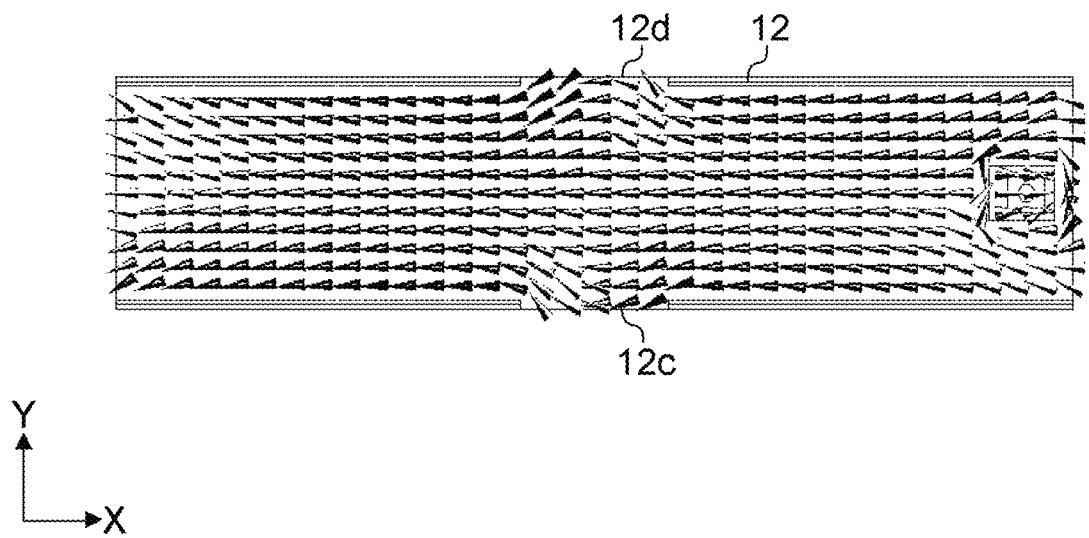
FIG. 10B is a plan view showing a direction of a current at the time of resonance on the high frequency side in the comparative example.

FIG. 10A is a plan view showing a direction of a current at the time of resonance on the low frequency side in a comparative example. FIG. 10B is a plan view showing a direction of a current at the time of resonance on the high frequency side in the comparative example. The RFID tag 10 shown in FIGS. 10A and 10B does not include the capacitance element 22 connected in series. Therefore, as shown in FIG. 10A, a null point Np1 is located at the longitudinal intermediate position of the first electrode 12. Additionally, as shown in FIG. 10B, since the RFIC chip 18 is disposed on the end portion side of the first electrode 12, the current flows in one direction from one end side of the first electrode 12 to the other end side at the time of resonance on the high frequency side.

Figure 11A:
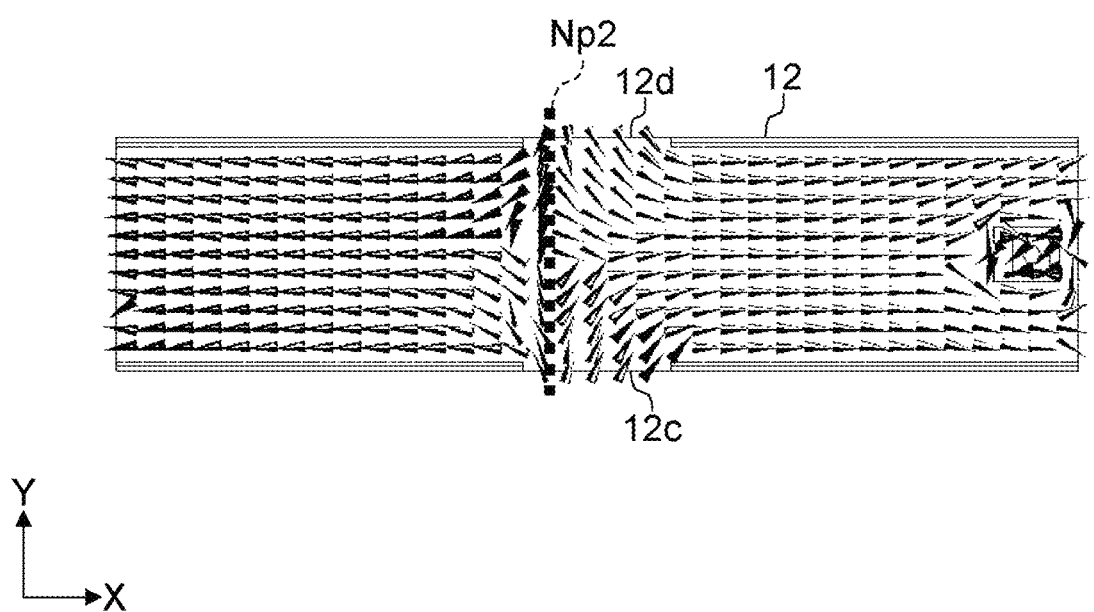
FIG. 11A is a plan view showing a direction of a current of resonance on the low frequency side of a simulation model.

FIG. 11A is a plan view showing a direction of a current at the time of resonance on the low frequency side of the simulation model. Since the capacitance element 22 is disposed in series with the first electrode 12 and the RFIC chip 18, a null point Np2 is moved toward the end portion on the side opposite to the end portion disposed with the RFIC chip 18. This changes the directivity of the RFIC chip 18.

Figure 11B:
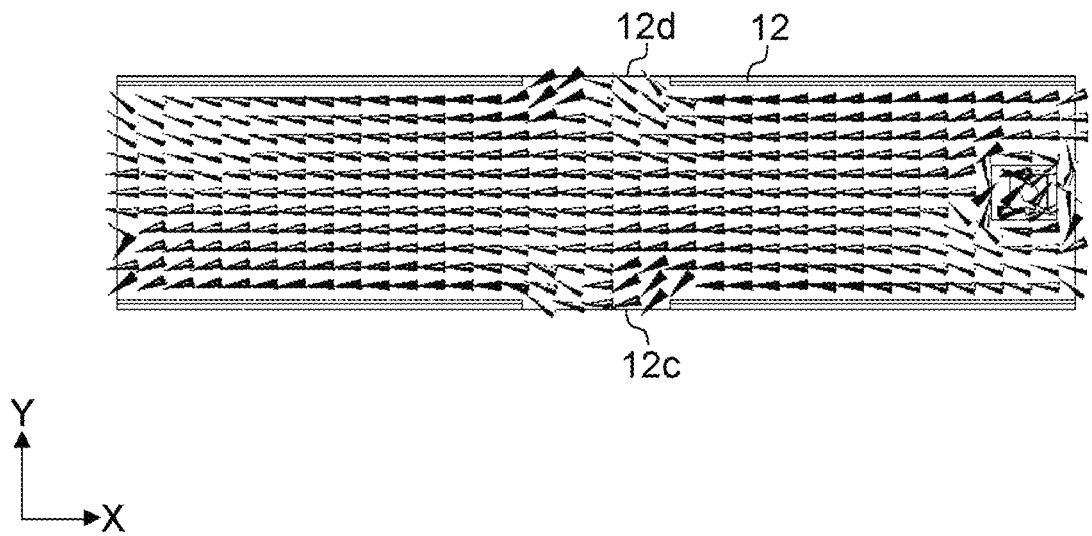
FIG. 11B is a plan view showing a direction of current of resonance on the high frequency side of the simulation model.
Figure 12:
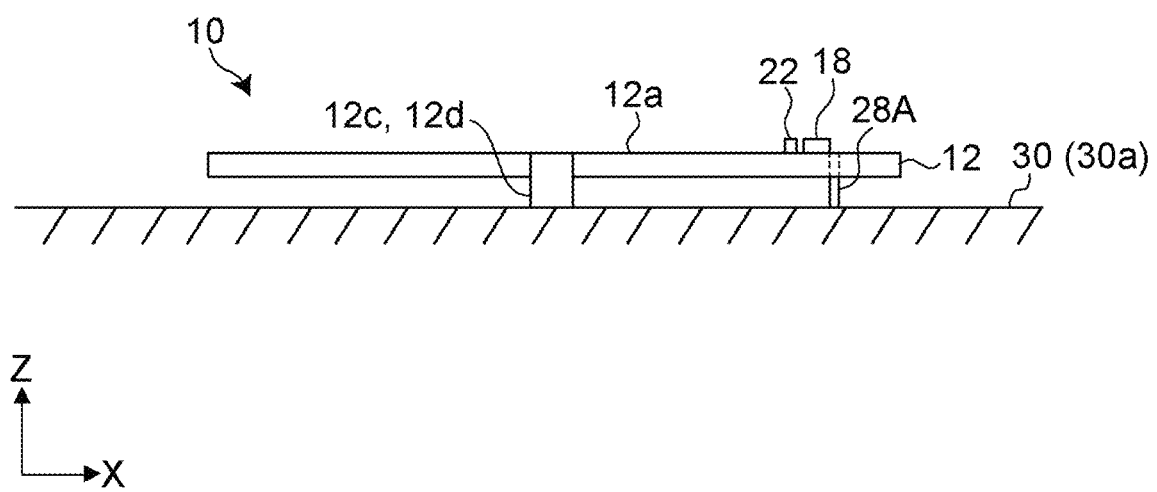
FIG. 12 is a side view showing a RFID tag of a modification.
Figure 13:
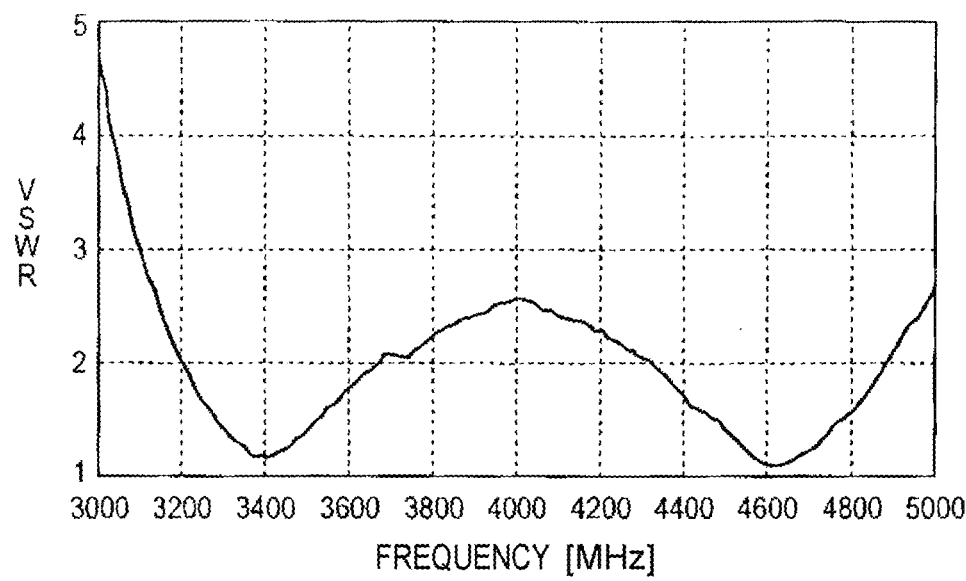
FIG. 13 is a graph showing a VSWR characteristic of a two-resonant antenna of a conventional example.

FIG. 11B is a plan view showing a direction of a current at the time of resonance on the high frequency side of the simulation model. Since the RFIC chip 18 is disposed on the end portion side of the first electrode 12, the current at the time of resonance on the high frequency side flows in one direction from one end side of the first electrode 12 toward the other end side as in the comparative example.

From the above description, the RFID tag 10 of the first exemplary embodiment includes the RFIC chip 18 having the first connection terminal 18a and the second connection terminal 18b, the first electrode 12 electrically connected to the first connection terminal 18a of the RFIC chip 18, the capacitance element 22 connected in series between the first electrode 12 and the RFIC chip 18, and the first short-circuit part 12c and the second short-circuit part 12d connecting the first electrode 12 and the second electrode 14 serving as a ground at an intermediate position of the electrical length of the first electrode 12. The electrical length of the first electrode 12 is a half of the wavelength of the communication frequency of the RFIC chip 18, and the first connection terminal 18a of the RFIC chip 18 is connected to the first electrode 12 at a position within one third of the electrical length from an end portion of the first electrode 12. The second connection terminal 18b of the RFIC chip 18 is connected to the second electrode 14.

The first electrode 12 is short-circuited with the ground at the intermediate position of the electrical length of the first electrode 12 and therefore is configured to function as a two-resonance antenna. Additionally, since the RFIC chip 18 is disposed on the end portion side of the first electrode 12, the RFIC chip 18 can be disposed in a portion with a low current density on the first electrode 12. As a result, an influence on high frequency resonance can be reduced. By connecting the RFIC chip 18, the first electrode 12, and the capacitance element 22 in series to each other, the null point on the low frequency side can be shifted. This can consequently reduce a gap between the respective peak angles of directivity on the high frequency side and the low frequency side, so that the directivity of the RFID tag 10 can be improved.

Moreover, the first connection terminal 18a of the RFIC chip 18 is connected to the first electrode 12 via the capacitance element 22 at a position within one third of the electrical length from the end portion of the first electrode 12.

The inductance element 20 connected in parallel to each of the first connection terminal 18a and the second connection terminal 18b of the RFIC chip 18 is included. As a result, an inter-terminal capacity between the first connection terminal 18a and the second connection terminal 18b of the RFIC chip 18 can be canceled.

The first connection terminal 18a of the RFIC chip 18 is connected to the first electrode 12 at a position within one sixth of the electrical length from the end portion of the first electrode 12, and the second connection terminal of the RFIC chip 18 is connected to the second electrode 14 at a position within one sixth of the electrical length from the end portion of the first electrode 12. By disposing the RFIC chip 18 closer to the end portion of the first electrode 12 in this way, the influence on high-frequency resonance can further be reduced.

The insulating substrate 16 is included between the first electrode 12 and the second electrode 14. As a result, the permittivity becomes higher than air, and therefore, the communication frequency can be shortened. By shortening the communication frequency, the longitudinal length of the first electrode 12 and the second electrode 14 can be reduced, and the RFID tag 10 can be reduced in size.

Moreover, the first electrode 12 and the second electrode 14 have a rectangular shape, and the electrical length of each of the first electrode 12 and the second electrode 14 is the electrical length in the longitudinal direction of the first electrode 12 and the second electrode 14.

In addition, the respective longitudinal open ends of the first electrode 12 and the second electrode 14 are bent to come closer to each other. As a result, a capacity is generated between the bent parts 12e and 14e respectively bent in the first electrode 12 and the second electrode 14, so that the communication frequency can be adjusted.

The first and second short-circuit parts 12c, 12d each connect longitudinal intermediate positions of the first electrode 12 and the second electrode 14. For example, the first and second short-circuit parts 12c, 12d can be conductive films or layers for connecting the longitudinal intermediate positions of the first electrode 12 and the second electrode 14.

Moreover, in an exemplary aspect, the connection conductor 28 that penetrates the insulating substrate 16 to electrically connect the first electrode 12 and the second electrode 14 is included, the second connection terminal 18b of the RFIC chip 18 is electrically connected to the connection conductor 28, and the connection conductor 28 is located at a position within one third of the electrical length from the end portion of the first electrode 12.

The connection conductor 28 is located at a position within one sixth of the electrical length from the end portion of the first electrode 12.

In general, it is noted that the exemplary embodiments of the present invention are not limited to the specific feature described above and can be implemented in modifications as follows.

In the exemplary embodiment, the second electrode 14 is configured to function as a ground on the assumption that the RFID tag 10 is affixed to a metal surface. However, in an alternative aspect, when the second electrode 14 is not affixed to a metal surface, a current also flows in the second electrode 14 in a direction opposite to that of the first electrode 12 and exhibits the same function as the first electrode 12 as a radiation plate.

Figure 14:
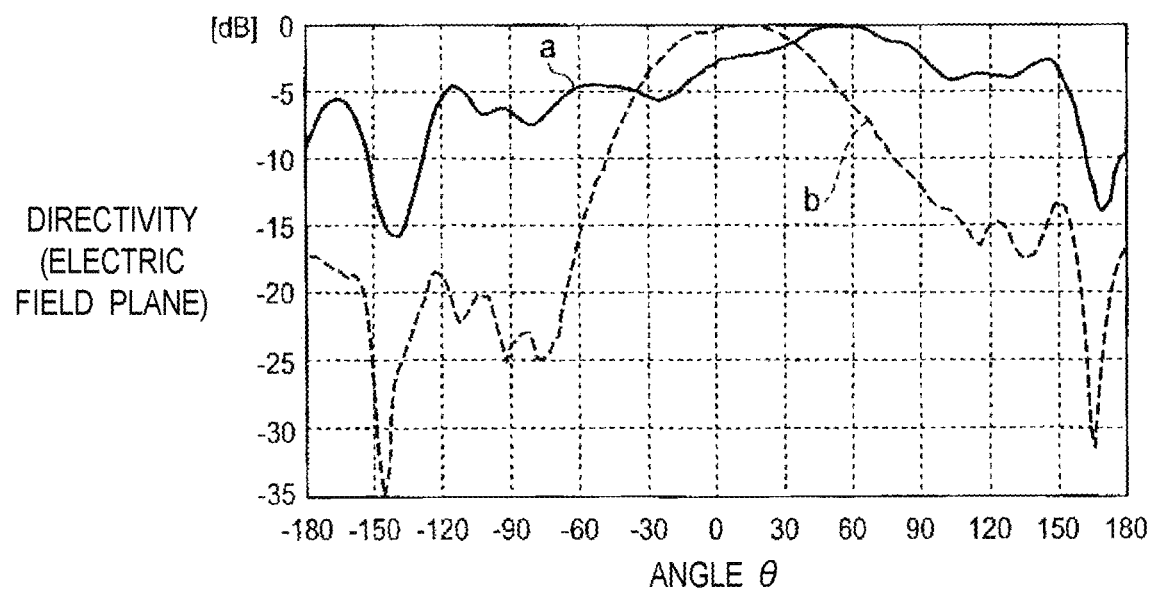
FIG. 14 is a graph showing directivity of the conventional two-resonance antenna.

In the embodiment, the RFID tag 10 includes the second electrode 14 configured as a ground. However, in an alternative aspect, the RFID tag 10 may not include the second electrode 14 and, for example, as shown in FIG. 14, the first electrode 12 may be connected to a metal surface 30a of an article 30 made of metal. The first short-circuit part 12c and the second short-circuit part 12d connect the central portion of the main body part 12a of the first electrode 12 and the metal surface 30a of the article 30. The second connection terminal 18b of the RFIC chip 18 may be connected to the metal surface 30a of the article 30 via a plate-shaped connection conductor 28A made of metal, for example.

In the exemplary embodiment, the RFIC chip 18 and the first electrode 12 are connected via the capacitance element 22. However, in an alternative aspect, the first connection terminal 18a of the RFIC chip 18 may be connected to the first electrode 12, and the capacitance element 22 may be connected in series between the second connection terminal 18b and the second electrode 14 serving as a ground.

EXPLANATIONS OF LETTERS OR NUMERALS

10 RFID tags
12 first electrode
12a main body part
12b opening part
12c first short-circuit part
12d second short-circuit part
12e bent part
14 second electrode
14a main body part
14e bent part
16 insulating substrate
16a region
18 RFIC chip
18a first connection terminal
18b second connection terminal
20 inductance element
22 capacitance element
24 wiring part
26 electrode surface
28 connection conductor

What is claimed:

1. An RFID tag comprising:
an RFIC chip including a first connection terminal and a second connection terminal;
a first electrode electrically connected to the first connection terminal of the RFIC chip;
a capacitance element connected in series to the first electrode and the RFIC chip; and
short-circuit parts that connect the first electrode to a ground at an intermediate position of an electrical length of the first electrode that is a half of a wavelength of a communication frequency of the RFIC chip,
wherein the first connection terminal of the RFIC chip is connected to the first electrode at a position within one third of the electrical length from an end side of the first electrode, and
wherein the second connection terminal of the RFIC chip is connected to the ground.

2. The RFID tag according to claim 1, wherein the first connection terminal of the RFIC chip is connected to the first electrode via the capacitance element at a position within one third of the electrical length from the end side of the first electrode.

3. The RFID tag according to claim 1, further comprising an inductance element connected in parallel to the first connection terminal and the second connection terminal of the RFIC chip.

4. The RFID tag according to claim 1, wherein the first connection terminal of the RFIC chip is connected to the first electrode at a position within one sixth of the electrical length from the end side of the first electrode, and the second connection terminal of the RFIC chip is connected to the ground at a position within one sixth of the electrical length from the end side of the first electrode.

5. The RFID tag according to claim 1, further comprising a second electrode that faces the first electrode, with the second electrode being configured as the ground.

6. The RFID tag according to claim 5, further comprising an insulating substrate disposed between the first electrode and the second electrode.

7. The RFID tag according to claim 5, wherein the first electrode and the second electrode each have a rectangular shape.

8. The RFID tag according to claim 7, wherein the electrical length of each of the first electrode and the second electrode is the electrical length in a longitudinal direction of the rectangular shape of the first electrode and the second electrode.

9. The RFID tag according to claim 8, wherein respective longitudinal open ends of the first electrode and the second electrode are bent towards each other.

10. The RFID tag according to claim 5, wherein the short-circuit parts each connect respective longitudinal intermediate positions of the first electrode and the second electrode to each other.

11. The RFID tag according to claim 6, further comprising a connection conductor that penetrates the insulating substrate to electrically connect the first electrode to the second electrode.

12. The RFID tag according to claim 11, wherein the second connection terminal of the RFIC chip is electrically connected to the connection conductor.

13. The RFID tag according to claim 12, wherein the connection conductor is located at a position within one third of the electrical length from the end side of the first electrode.

14. The RFID tag according to claim 13, wherein the connection conductor is located at a position within one sixth of the electrical length from the end side of the first electrode.

15. An RFID tag comprising:
an RFIC chip that includes first and second connection terminals;
a first electrode having a rectangular shape and being electrically connected to the first connection terminal of the RFIC chip;
a capacitance element connected in series to the first electrode and the RFIC chip; and
at least one short-circuit film that connects the first electrode to a ground at an intermediate position of an electrical length of the first electrode that is a half of a wavelength of a communication frequency of the RFIC chip,
wherein the electrical length of the first electrode is defined by a longitudinal length of the first electrode,
wherein the first connection terminal of the RFIC chip is connected to the first electrode at a position within one third of the electrical length from an end side of the first electrode, and
wherein the end side of the first electrode is perpendicular to the longitudinal length of the first electrode.

16. The RFID tag according to claim 15, wherein the second connection terminal of the RFIC chip is connected to the ground.

17. The RFID tag according to claim 16, further comprising an inductance element connected in parallel to the first connection terminal and the second connection terminal of the RFIC chip.

18. The RFID tag according to claim 16, further comprising a second electrode that faces the first electrode, with the second electrode being configured as the ground.

19. The RFID tag according to claim 18, further comprising an insulating substrate disposed between the first electrode and the second electrode.

20. The RFID tag according to claim 19, further comprising:

a connection conductor that penetrates the insulating substrate to electrically connect the first electrode to the second electrode,
wherein the second connection terminal of the RFIC chip is electrically connected to the connection conductor, and
wherein the connection conductor is located at a position within one third of the electrical length from the end side of the first electrode.

* * * * *